2,948,586
Patented Aug. 9, 1960

United States Patent Office

2,948,586
FUSED SALT PROCESS FOR RECOVERY OF VALUES FROM USED NUCLEAR REACTOR FUELS

Raymond H. Moore, Richland, Wash., assignor to the United States of America as represented by the United States Atomic Energy Commission No Drawing. Filed July 24, 1958, Ser. No. 750,835

15 Claims. (Cl. 23—14.5)

This invention deals with a method of processing fuel material of neutronic reactors and in particular with the separation and recovery of plutonium. The invention is applicable to the processing of neutron-bombarded mixtures of uranium, plutonium and fission product oxides or to alloys or mixtures of these metals. The process is especially valuable for treating neutron-bombarded uranium-aluminum alloys as they are used in the so-called plutonium recycle test reactors; these reactors are described, for instance, in report HW–50700 published by General Electric Company. Uranium-aluminum alloys are also in use in other low-temperature reactors.

It is an object of this invention to provide a process for recovering plutonium from neutron-bombarded fuel material which is simple and comprises a few steps only.

It is another object of this invention to provide a process for recovering plutonium from neutron-bombarded fuel material which does not require dissolution of the material in an aqueous medium, so that the plutonium is recovered in a comparatively concentrated form.

It is also an object of this invention to provide a process for recovering plutonium from neutron-bombarded fuel material which operates with small volumes of masses, so that the process can be carried out in a small plant space and with relatively little shielding.

It is finally another object of this invention to provide a process for recovering plutonium from neutron-bombarded fuel material which can be carried out in relatively simple and cheap equipment primarily because it does not require operation at superatmospheric pressure.

These objects are accomplished by converting a neutron-bombarded uranium mass containing plutonium and fission product values to a chloride mixture (the term "chlorides" in this case is to include oxychlorides) by dissolving the mass in an excess of molten alkali metal-aluminum double chloride; adding aluminum metal to the mixture whereby the uranium chloride formed is reduced to uranium metal and a salt phase and a metal phase are formed, said salt phase containing the plutonium chloride and fission product chlorides and said metal phase containing said aluminum and said uranium metal in the form of an alloy; and separating the salt phase from the metal phase. The alkali metal-aluminum double chloride, for the sake of simplicity, will be referred to hereinafter simply as "double chloride." The dissolving step and the reduction with aluminum can be carried out successively or they can be combined in one step; the latter is preferred.

As has been mentioned above, the neutron-bombarded material can be in the form of oxide, the metal or in any other form that is convertible to the chlorides by means of an alkali metal-aluminum double chloride. Of course, a chloride mixture can also be used as the starting material.

The double chloride is preferably prepared by mixing approximately equimolar quantities of alkali metal chloride and aluminum chloride; the use of an excess of the double chloride mixture is advantageous. As the alkali metal chloride, either potassium or sodium chloride can be used. The aluminum chloride in this double chloride mixture has a radically lower vapor pressure than has aluminum chloride alone. At a temperature up to about 770° C. the double chloride does not give off volatile products and at 700° C. the vapor pressure of the aluminum chloride over the fused double chloride was found to be far below atmospheric pressure; in contradistinction thereto the vapor pressure of aluminum chloride is 1 atmosphere at about 180° C. and 3000 atmospheres at 400° C. Therefore, by using the double chloride, pressure-resistant equipment is not necessary which makes the process less expensive.

The potassium-aluminum chloride melts at about 260° C.; however, an operating temperature of from 400 to 800° C. is the preferred range.

The uranium or uranium oxide dissolves in the double chloride as the chloride or oxychloride, for instance as uranyl chloride, and the plutonium as plutonium trichloride. Some of the fission products volatilize; for instance, zirconium and niobium are volatilized to some degree as the chlorides.

The following examples illustrate the dissolution of neutron-bombarded uranium masses under various conditions in the absence of aluminum metal.

Example I

Four grams of uranium oxide, $UO_3$, were introduced into 20 grams of molten potassium-aluminum chloride having a temperature of 600° C. Dissolution of the uranium oxide was complete after 10 minutes. The solution formed was clear and red, but it turned yellow upon cooling and solidification.

An analogous experiment was carried out with uranium dioxide; in this case the red melt turned green after solidification.

Example II

Two grams of uranium trioxide powder were added to 21 grams of potassium-aluminum chloride, and the mixture was heated from 25° to 500° C. within 7 minutes. 95% of the uranium trioxide had then dissolved.

Example III

One gram of uranium dioxide powder was mixed with 10 grams of potassium-aluminum chloride; the mixture was heated and held at 770° C. for 30 minutes. Dissolution was then complete.

Example IV 1.0 gram of plutonium dioxide powder was added to 10 grams of potassium-aluminum chloride, and the mixture was heated from 25° to 520° C. in 90 minutes. This brought about complete dissolution of the plutonium dioxide.

Example V

A solid cylindrical 1.032-gram piece of uranium metal ⅛" x 3/16" was added to 11.5 grams of potassium-aluminum chloride. The mixture was heated to 650° C. and held at that temperature for 7 minutes. By then 75% of the uranium metal had dissolved.

In dissolving neutron-bombarded uranium oxide in the double chloride, frequently aluminum oxide forms and precipitates. In view of the insolubility of the oxide, the latter does not prevent the reaction from reversing and from proceeding to completion. However, the aluminum oxide has to be removed from the mass, e.g. by filtration or centrifugation, prior to the separation of the plutonium chloride. If massive pieces of uranium oxide are to be processed, the aluminum oxide deposits on the surface of said pieces and coats it so that inner parts of the oxide piece become inaccessible for further reaction. Both grinding of uranium dioxide in order to avoid the surface coating and also filtration or centrifugation for the removal of aluminum oxide add to the cost of the process.

It has been found that the formation of aluminum oxide can be prevented, or at least greatly reduced, by sparging the double chloride-containing mass during dissolution with carbon tetrachloride vapors; the carbon tetrachloride is preferably carried by an inert gas, such as nitrogen, argon and helium. By this means it is made possible to use massive uranium and still to avoid the necessity of filtration or centrifugation. A further advantage of sparging with carbon tetrachloride resides in the reaction of the $CCl_4$ with the oxides or metal of the mass to be treated under chloride formation; this reaction, of course, assists in and accelerates the dissolving step. This reaction, which is exothermic, probably takes place according to the following equations:

$$2Al_2O_3 + 3CCl_4 \rightarrow 4AlCl_3 + 3CO_2$$
$$UO_2 + CCl_4 \rightarrow UCl_4 + CO_2$$

Since the carbon tetrachloride takes over part of the chlorination, the consumption of aluminum chloride present in the melt is reduced and the composition of the melt remains more nearly constant. Instead of carbon tetrachloride other carbon halides, such as carbon tetrabromide and carbonyl chloride, can be used.

The following two examples will illustrate the improvement accomplished by dissolving uranium oxide in the presence of carbon tetrachloride.

*Example VI*

Two parallel runs were made each using 40 grams of potassium-aluminum chloride and 8 grams of uranium dioxide. The mixture in each instance was maintained at 570° C. for one hour; in one instance the mixture was sparged during this time with argon that had been saturated with carbon tetrachloride vapor at 50° C., while in the other case sparging was not applied. The reaction mass in which no sparging had been used was found to contain about 25 times as much aluminum oxide as the sparged mixture.

*Example VII*

A total of 60 grams of uranium dioxide was added in three 20-gram installments to 104 grams of potassium-aluminum chloride having a temperature of about 650° C. This temperature was maintained for three hours. Two parallel experiments were run, one using sparging with carbon tetrachloride as described in Example VI, the other one without sparging. The sparged reaction mixture contained about one-third of the amount of aluminum oxide that was present in the reaction mass obtained without sparging.

Aluminum, as has been mentioned before, can be added together with the double chloride; this is the preferred embodiment because the double chloride has a pronounced effect on the reducing reaction. Normally uranium chloride cannot be reduced with aluminum, and from thermodynamic calculations a reduction cannot be expected. Therefore it was quite surprising when it was discovered that in the presence of the double chloride a reduction of uranium chloride does take place. It is believed that this effect of the double chloride is not due to volatilization of aluminum chloride and thus to a mass reaction effect, because in spite of the volatilization of some aluminum chloride a large amount of it is present in the solution at all times. The reason for this different reaction of the aluminum in the presence of the double chloride is not known and an explanation therefore cannot be given.

The aluminum is preferably added in an amount excessive of that stoichiometrically required for the reduction of uranium. It was also found that the presence of air during the reduction is important, because in the absence of air only one-third of the uranium was reduced, while with air the reduction yield ranged up to 80 to 90%. When the aluminum was added to the red melt of neutron-bombarded uranium or uranium oxide in the double chloride, the color first changed to purple and remained purple until practically all of the uranium was reduced.

Some of the fission products always present in neutron-irradiated uranium, as has been set forth above, are volatilized during the dissolution and reduction reactions; the bulk, however, is converted to the chlorides and taken up by the salt phase. A few runs were made to determine behavior of cerium and also of thorium in the process of this invention. The conditions of these runs and their results are set forth in Example VIII.

*Example VIII*

Twenty milligrams of cerous oxide, $Ce_2O_3$, with trace concentrations of $Ce^{144}$ and 0.0035 mole of uranium trioxide were added to 0.048 mole of potassium-aluminum chloride having a temperature of 700° C. Aluminum was added in a quantity of 0.148 mole. The reaction temperature of 700° C. was maintained for 10 minutes, and the salt phase was then analyzed. The salt phase was found to contain $10^6$ times the activity of that in the formed uranium-aluminum metal phase.

Two analogous runs were made with thorium oxide and plutonium dioxide, respectively, added instead of the cerous oxide. The metal phase in the thorium run was found to contain 11% of the thorium present, while in the case of the plutonium run only 1% of the plutonium had been reduced to the metal. This indicates clearly that thorium and plutonium are substantially taken up by the salt phase and are thus separated from the uranium.

The separation of the salt phase from the metal phase can be carried out by any means known to those skilled in the art. For instance, the reaction mass can be cooled until the metal phase has solidified, but only so much that the salt phase is still in the liquid state. Cooling to from about 500 to 400° C. is satisfactory for this purpose. The salt phase can then simply be poured off the solid metal phase.

The metal phase can be recycled as is and be used as fuel in a reactor. The plutonium chloride contained in the salt phase can either be reduced to the metal, or the salt phase can be dissolved in an aqueous medium, e.g. in mineral acid, and the plutonium can then be recovered from the aqueous solution, for instance, by solvent extraction or by precipitation. This phase of the process, however, is not part of the invention.

One method of recovering the plutonium from the salt phase comprises the addition of metallic calcium or calcium and magnesium as reducing agent. For instance, an aluminum alloy containing 5% by weight of calcium was found to be an effective reducing agent for the plutonium chloride and any minor quantity of uranium chloride that might be present and to effect transfer of the reduced metals to the aluminum metal phase. A mixture or alloy of calcium and magnesium metals has given equally good results. The metal obtained by these reductions of the salt phase is suitable as fuel for neutronic reactors.

Simple crucibles, preferably with a lid that has an outlet for gas exhaustion, are usable for carrying out the process of this invention. Stainless steel and copper were found not to be very good materials for these crucibles. Quartz, platinum and tungsten proved to be highly satisfactory materials.

In the following, a few examples are given to illustrate the separation of plutonium from neutron-irradiated uranium by the process of this invention.

*Example IX*

A quantiy of 1.115 grams of a $UO_2$—$PuO_2$ mixture containing 0.49% of plutonium was dissolved in 15.0 grams of potassium-aluminum chloride at a temperature of between 715 and 735° C. 5.137 grams of aluminum were then added, and the mixture was maintained at the temperature range for five hours in an argon atmosphere. Thereafter the mass was cooled to about 500° C. and the liquid salt phase was separated from the solid metal phase; both phases were analyzed. The metal phase contained 89.3% of the uranium originally present, and the salt phase had taken up 97.8% of the plutonium originally present.

*Example X*

A plutonium-aluminum-uranium alloy was used in this example in an amount of 8.655 grams. The alloy contained 0.437 gram of uranium and $3.1 \times 10^{-3}$ gram of plutonium; the balance was aluminum. 15.1 grams of potassium-aluminum chloride, but no aluminum metal, were added. The same temperature range as in Example IX was maintained for five hours, and both phases were then analyzed. The metal phase was found to contain 91.1% of the uranium present, and the salt phase contained 96.0% of the original plutonium content.

*Example XI*

Uranyl chloride corresponding to 0.0018 mole of $UO_3$ was dissolved in 0.048 mole of $KAlCl_4$ in a quartz container at a temperature of about 770° C., and 0.148 mole of aluminum metal was added to the mixture. An immediate reaction took place which was obvious from the purple color of the melt. After 20 minutes the purple color had disappeared; the reaction mixture was then quenched by pouring it into a porcelain evaporating dish, and the salt phase was poured off the solidified metal layer. The metal was analyzed and found to contain, as the metal, 79% of the uranium originally added in the form of the uranyl chloride.

*Example XII*

A sample of aluminum containing 1.65% by weight of plutonium was contacted in air with a salt phase that consisted of potassium-aluminum chloride and uranium tetrachloride in an amount corresponding to 8% by weight or uranium and had a temperature of about 770° C. The contact was maintained at this temperature for 40 minutes. The salt phase was separated from the metal phase and both were analyzed. The salt phase was found to contain 95% of the original plutonium present and the metal phase about 50% of the total uranium.

While practically all of the examples given in this specification deal with the separation and recovery of plutonium from uranium-plutonium mixtures, the process of this invention proved to be equally well applicable to the separation of rare earths, alkaline earths and alkali metals from uranium.

It will be understood that this invention is not to be limited to the details given herein, but that it may be modified within the scope of the appended claims.

What is claimed is:

1. A process of recovering plutonium values from a neutron-bombarded uranium mass also containing plutonium and fission products comprising dissolving said mass in fused alkali metal-aluminum double chloride in which the molal ratio of alkali metal chloride and aluminum chloride is about 1:1; adding aluminum metal to the mixture thus obtained; maintaining the mixture at a temperature of between 260 and 800° C. whereby uranium metal is obtained and a metal phase containing said uranium metal and a salt phase containing plutonium chloride and fission product chlorides form; and separating said metal phase from said salt phase.

2. The process of claim 1 wherein the temperature range is between 400 and 800° C.

3. The process of claim 1 wherein said neutron-bombarded mass is an oxidic mass.

4. The process of claim 1 wherein said neutron-bombarded mass is a uranium-aluminum alloy.

5. The process of claim 1 wherein the alkali metal-aluminum double chloride is potassium-aluminum chloride.

6. The process of claim 1 wherein the double chloride and the aluminum metal are used in excess quantities over the amounts stoichiometrically required for the formation of uranium tetrachloride, plutonium trichloride and fission product chlorides 7. The process of claim 1 wherein the neutron-bombarded uranium mass is held in contact with air during processing.

8. The process of claim 1 wherein the metal phase and the salt phase are separated from each other by cooling the mixture to from 500 to 400° C. and removing the molten salt phase from the solidified metal phase.

9. The process of claim 1 wherein a carbon-halide-containing inert gas is passed through the melt while the temperature of from 400 to 800° C. is maintained.

10. The process of claim 9 wherein the carbon halide is carbon tetrachloride.

11. The process of claim 1 wherein the separated salt phase is processed further by adding metal selected from the group consisting of calcium, magnesium and calcium plus magnesium, whereby the plutonium chloride is reduced to the metal and the plutonium metal is separated from the remaining salt.

12. A process of recovering plutonium values from a neutron-bombarded uranium mass also containing plutonium and fission product values, comprising adding fused potassium-aluminum double chloride and metallic aluminum to said neutron-bombarded mass, the molal ratio of potassium chloride and aluminum chloride in said double chloride being about 1:1; maintaining the mixture thus obtained at a temperature of from 400 to 800° C. whereby uranium metal is obtained and a metal phase containing said uranium metal and a salt phase containing plutonium chloride and fission product chlorides form; and separating said metal phase from said salt phase.

13. A process of dissolving a neutron-bombarded uranium mass comprising adding an alkali metal-aluminum double chloride, of an approximate molal ratio of 1 alkali metal chloride: 1 aluminum chloride, to said mass and heating the mixture thus obtained to a temperature of from 260 to 800° C.

14. A process of separating cerium values from uranium values, comprising adding an alkali metal-aluminum double chloride and aluminum metal to the cerium-uranium values mixture, said double chloride containing the alkali metal chloride and the aluminum chloride in a molal ratio of about 1:1; heating the mixture to between 260 and 800° C. whereby a uranium-containing metal phase and a cerium-containing salt phase are formed; and separating said two phases from each other.

15. A process of recovering plutonium values from a neutron-irradiated uranium-aluminum alloy containing said plutonium values and fission product values, comprising adding alkali metal-aluminum double chloride in which the molal ratio of alkali metal chloride to aluminum chloride is about 1:1 to said alloy, heating the mixture to and maintaining it at a temperature of between 400 and 800° C. whereby a salt phase containing plutonium chloride and fission product chlorides and a metallic aluminum phase containing uranium metal is obtained, and separating said two phases.

References Cited in the file of this patent

UNITED STATES PATENTS

| | | |
|---|---|---|
| 2,758,023 | Bareis | Aug. 7, 1956 |
| 2,840,464 | Wiswall | June 24, 1958 |

OTHER REFERENCES

Motta: "Peaceful Uses of Atomic Energy," vol. 9, pages 596–603, Aug. 8–20, 1955.